3,475,269
PROCESS OF FORMING DIELECTRIC PAPER
William B. Cranford, Anthony J. Petricola, and Murray J. McLeod, Hawkesbury, Ontario, Canada, assignors to Canadian International Paper Company, Montreal, Quebec, Canada, a corporation of Canada
No Drawing. Filed Mar. 11, 1966, Ser. No. 533,443
Int. Cl. D21h 3/66
U.S. Cl. 162—138                          5 Claims

ABSTRACT OF THE DISCLOSURE

The dissipation factor of a pulp and an improvement in dielectric properties of the resulting paper is achieved by acidic removal of metallic constituents, followed by reaction of free carboxyl groups in the pulp with divalent metal selected from barium, calcium, mangesium and strontium.

---

This invention relates to the production of papers having improved dielectric properties. More particularly, it relates to a process leading to condenser and cable grade papers having a diminished susceptibility to dielectric loss, i.e., to dissipation of energy within the dielectric due to a sinusoidal electric stress, which is characterized by expression $\omega CV^2 \tan \delta$, where $\omega$ is $2\pi \times$ frequency, C is the capacitance, V is the voltage, and $\tan \delta$ is the power factor.

Paper has been and remains a very suitable material for dielectrics in capacitors and for cable insulation applications, but modern capacitor and cable designs require ever higher quality paper dielectrics and insulation with lower dielectric loss (dissipation factor, $\tan \delta$) over a wide range of voltage stress and temperature. Significant improvements have been made by both the pulp and paper makers in recent years and continued efforts are being made to obtain papers of lower loss characteristics.

The mechanism of dielectric loss or conduction in a heterogeneous substaance such as paper or liquid-impregnated paper is extremely complex and is not fully understood. Dielectric loss is generally attributed to (A) rotation of dipoles present, and (B) oscillation of free ions.

Ionic material is always present in paper to some extent. Some of the possible sources of ions are:

(1) Raw wood: Many metallic ions are present in the tree and others are added in the cutting, barking, and wood handling;

(2) Pulping and refining process equipment and mill liquors and waters;

(3) Papermaker's processing equipment (beaters, refiners, etc.);

(4) Dissociation of any moisture in the finished product, i.e., $H_2O \rightleftharpoons H^+ + OH^-$;

(5) Dissociation of the liquid impregnant (e.g. Aroclor);

(6) Aging: Uronic acids are formed, especially at high temperatures. These are associated not so much with the cellulose itself, but with the beta and gamma cellulose content of the paper, i.e., the hemi-celluloses, as well as with lignin, resins, etc.

$Li^+$, $Na^+$, $K^+$, $NH_4^+$, and especially $H^+$, are the most harmful insofar as dielectric loss is concerned. Divalent cations such as $Ca^{++}$, $Mg^{++}$, $Ba^{++}$, $Sr^{++}$ are least harmful. Trivalent and tetravalent cations are thought to lie somewhere between these with respect to effect on dielectric properties. The mechanism is not fully understood, but the results achieved in the work leading to the present invention indicates that:

(a) Ionic mobility and
(b) Affinity for functional groups (blocking carboxyl groups) are influential factors.

Thus, monovalent cations are very mobile and possess relatively low affinity for organic functional groups and, because of these characteristics, contribute substantially to dielectric losses in paper. Trivalent and tetravtlent cations, although least mobile, do not combine readily with these functional groups, because of steric hindrance. The divalent cations appear to have the best combination of affinity for carboxyl groups and diminished mobility.

Accordingly, replacement of monovalent cations with divalent cations is beneficial in reducing dielectric loss in papers.

Indeed, it has now been found that large reductions in the dissipation factor ($\tan \delta$) of pulps can be achieved if the pulps intended for capacitor and cable insulation papers are treated in aqueous solutions with compounds of barium, calcium, magnesium, and strontium. The acetates, hydroxides, sulfates, and other salts of these cations, show promise.

$Mg(OH)_2$, $MgO$, $MgSO_4$, and $Ba(OH)_2$ have been found very effective. The hydroxide, in addition, neutralizes the deleterious presence of the worst offenders in terms of dielectric loss, i.e., the hydrogen ions. (Since one of the main conduction mechanisms is believed to be that of protonic conduction, a pH over 7.0 is desirable in eliminating hydrogen ions). This type of treatment has been found to be effective even against the dielectric loss which would be expected in conditions of prolonged pulp aging at high temperature (about 120° C.).

In accordance with the present invention, and by way of a typical example, pulp (raw stock) is washed with water and then subjected to an acid soak to remove most of the metallic contaminants (ash). The addition of $SO_2$ at pH 3.0, 40° C., and 2½% O.D. for 30 minutes accomplished this, though other acids can be used. The pulp is then well washed to remove the acid.

Next magnesium hydroxide is metered into the pulp slurry at a pH of about 6.0 to 9.0, preferably above 7.0 and best about 8.0. If an acid salt such as $MgSO_4$ is used, the initial pH will generally fall below 7.0. The pulp can have a wide range of consistency, but preferably from about 2% to 6% O.D. and can have a temperature in the range of room temperature to boiling. 2½% O.D. and 40° C. have been found effective.

For the best results, provision should be made to obtain uniform blending of the pulp and the magnesium hydroxide and to allow enough time, e.g., up to 120 minutes, for the reactions involved to be completed. As already mentioned, these ion exchange reactions involve the functional groups (carboxyl groups of uronic acids and phenolic $OH^-$ groups) associated with $\gamma$- and $\beta$-celluloses and lignin and can be represented as follows:

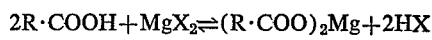

$$2R \cdot COOH + MgX_2 \rightleftharpoons (R \cdot COO)_2Mg + 2HX$$

where R is a polysaccharide matrix and X is an acetate, chloride, hydroxide, sulfate, etc., anion.

Finally, the pulp should be thoroughly washed to remove the excess, unreacted magnesium compounds, etc., and is ready for conventional handling.

It has been found that when two portions of pulp, one dealt with in accordance with the present invention and as described above and the other merely acid soaked and washed as described above, are compared in terms of dissipation factor, $\tan \delta$, the pulp subjected to the process of the present invention has such factor reduced by 40% or more.

We claim:
1. A process for improving the dielectric properties of paper produced from pulp, by removing monovalent cations therefrom, comprising a step of solubilizing metallic constituents by acid soaking an aqueous slurry of the pulp with $SO_2$ at a pH of about 3.0, a second step of removing acid soluble metallic constituents by washing the acid soaked pulp with water, a third step of reacting the washed pulp completely at an initial pH in the range of about 6 to 9 with a compound selected from the group of barium, calcium, magnesium, and strontium cation-containing acetates, chlorides, hydroxides, and sulfates, in an amount sufficient to replace the monovalent cations; and a fourth step of washing the fully reacted pulp free of unreacted salts and compounds, with water.

2. The process of claim 1 wherein the compound is barium hydroxide.

3. The process of claim 1 wherein the compound is magnesium hydroxide.

4. The process of claim 1 wherein the compound is magnesium sulfate.

5. The process of claim 1 wherein the third step is carried out at a pH about 8, using a hydroxide of Ba, Mg, Ca, or Sr.

References Cited

UNITED STATES PATENTS

| | | |
|---|---|---|
| 2,639,989 | 5/1953 | Conover. |
| 2,767,090 | 10/1956 | Dunlap. |
| 3,090,705 | 5/1963 | Miksits _____ 162—138 X |

S. LEON BASHORE, Primary Examiner

U.S. Cl. X.R.

162—181; 252—63.5